United States Patent

[11] 3,598,982

| [72] | Inventor | Philip L. Lawrence<br>Riverside, Conn. |
| --- | --- | --- |
| [21] | Appl. No. | 659,235 |
| [22] | Filed | Aug. 8, 1967 |
| [45] | Patented | Aug. 10, 1971 |
| [73] | Assignee | Mobil Oil Corporation<br>Continuation of application Ser. No.<br>309,462, Sept. 17, 1963, now abandoned. |

| [54] | SYSTEMS FOR MODIFYING FUNCTIONS INCLUDING A CONVOLUTION OPERATION<br>8 Claims, 11 Drawing Figs. | |
| --- | --- | --- |
| [52] | U.S. Cl. | 235/197,<br>235/181, 340/15.5 |
| [51] | Int. Cl. | G06g 7/19,<br>G01v 7/36 |

| [50] | Field of Search | 235/181,<br>183, 197, 193; 340/15.5 C |
| --- | --- | --- |

Primary Examiner—Malcolm A. Morrison
Assistant Examiner—Joseph F. Ruggiero
Attorneys—William J. Scherback, Sidney A. Johnson and Donald J. Dickson ABSTRACT: A convolution technique in which a function to be filtered is convolved with an operator of a selected character. In this manner, low-pass, high pass and band-pass type filtering or any combination thereof can be achieved.

Convolution of a function which varies in amplitude along a scale with an operator including positive and negative step functions spaced along the scale will produce low-pass filtering of the function.

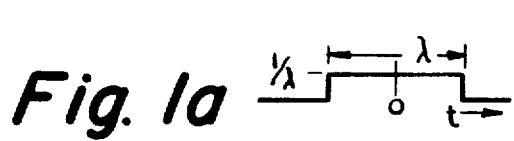
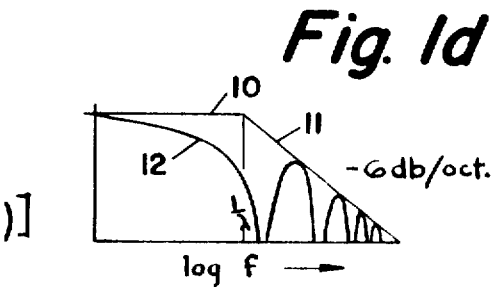
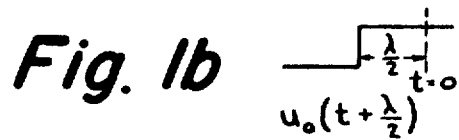
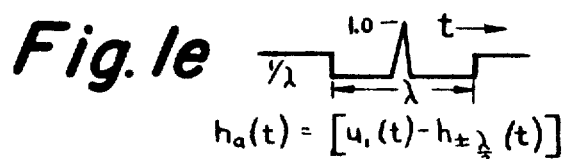
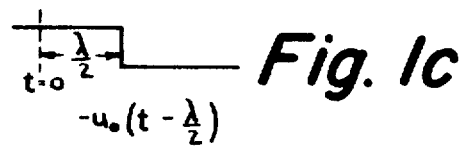
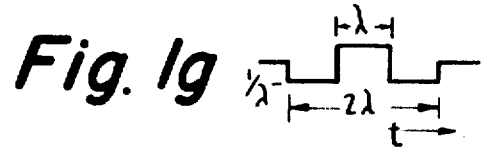
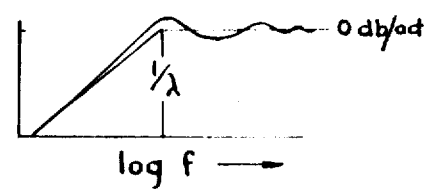
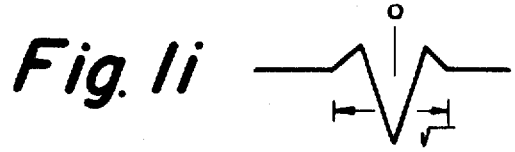
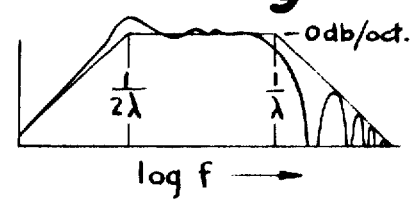
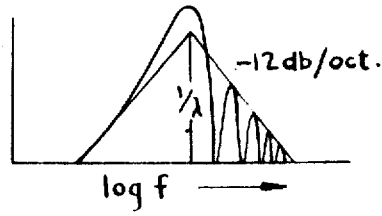

SYSTEMS FOR MODIFYING FUNCTIONS INCLUDING A CONVOLUTION OPERATION

This is a continuation of Ser No. 309,462 filed Sept. 17, 1963 and now abandoned.

This invention relates to methods of and means for convolving a function which varies in amplitude along a scale with an operator of a kind which may be expressed in terms of step functions, respectively positive and negative, and occurring at different positions along the scale.

In my application, Ser. No. 214,973, entitled "Method of and Means for Treating Gravity Profiles," filed Aug. 6, 1962, and abandoned in favor of continuing application Ser. No. 669,314, filed Sept. 20, 1967, there is described methods of and apparatus for treating gravity profile information in a manner to enhance anomalies. More particularly, the gravity profile in the form of a function varying in amplitude along a distance scale was convolved with a plurality of operators, each comprised of step functions but of differing spacing and polarity along the scale.

The convolution technique is quite time consuming on a digital computer. On the other hand, when analog equipment is used for convolution, phase distortion may be introduced. Both of these disadvantages are minimized by the present invention.

In accordance with the present invention, the methods of and apparatus for utilizing the operators in the convolution of functions varying in amplitude along a scale have been extended and the nature and character of the operators modified. The convolution of a function with an operator including positive and negative step functions is mathematically the equivalent of a filtering operation such as has heretofore been accomplished with electrical circuit components widely utilized for such purposes. Where filtering operations are to be accomplished with relatively low frequencies, the size of the electrical components become quite large and expensive. Where the convolution operations themselves are utilized, they do not lend themselves to computer operation, particularly of the digital type because in many computers the speed of carrying out the convolution computation is less than for other kinds of operations.

In accordance with the present invention the filtering operation may be rapidly and conveniently achieved by convolving the function to be filtered with an operator of a selected character. Thus, there may be conveniently achieved filtering of the low-pass, high pass and band-pass type and any combination thereof.

Convolution of the function which varies in amplitude along a scale with an operator including two-step functions, respectively, positive and negative, and spaced along said scale, produces a low-pass filtering of the function. Band-pass and high pass filtering can be achieved by further extensions of this technique.

A mathematical explanation of the convolution operation is contained in STATISTICAL THEORY OF COMMUNICATION, by Y. E. Lee, pages 27–32. However, for the purposes of this patent application, it will be sufficient to explain that the convolution of a function $i(t)$ which varies in amplitude along a scale with an operator $h(t)$ is denoted as $i(t)*h(t)$. Where $h(t)$ is a unit-step operator, the convolution can be expressed as follows:

$$i(t)*h(t) = \int i(t)dt$$

For further objects and advantages of the invention together with detailed instructions of how to construct apparatus embodying the invention and to practice the methods of the invention, reference is to be had to the following detailed description taken in conjunction with the accompanying drawings, in which:

FIG. 1a shows a step function operator;

FIGS. 1b and 1c show step functions which make up the operator of FIG. 1a;

FIG. 1d shows the output response obtained by convolution with the operator of FIG. 1a;

FIG. 1e shows another operator;

FIG. 1f shows the output response obtained by convolution with the operator of FIG. 1e;

FIG. 1g shows another operator;

FIG. 1h shows the output response obtained by convolution with the operator of FIG. 1g;

FIG. 1i shows another operator;

FIG. 1j shows the output response obtained by convolution with the operator of FIG. 1i.

Figure 2:
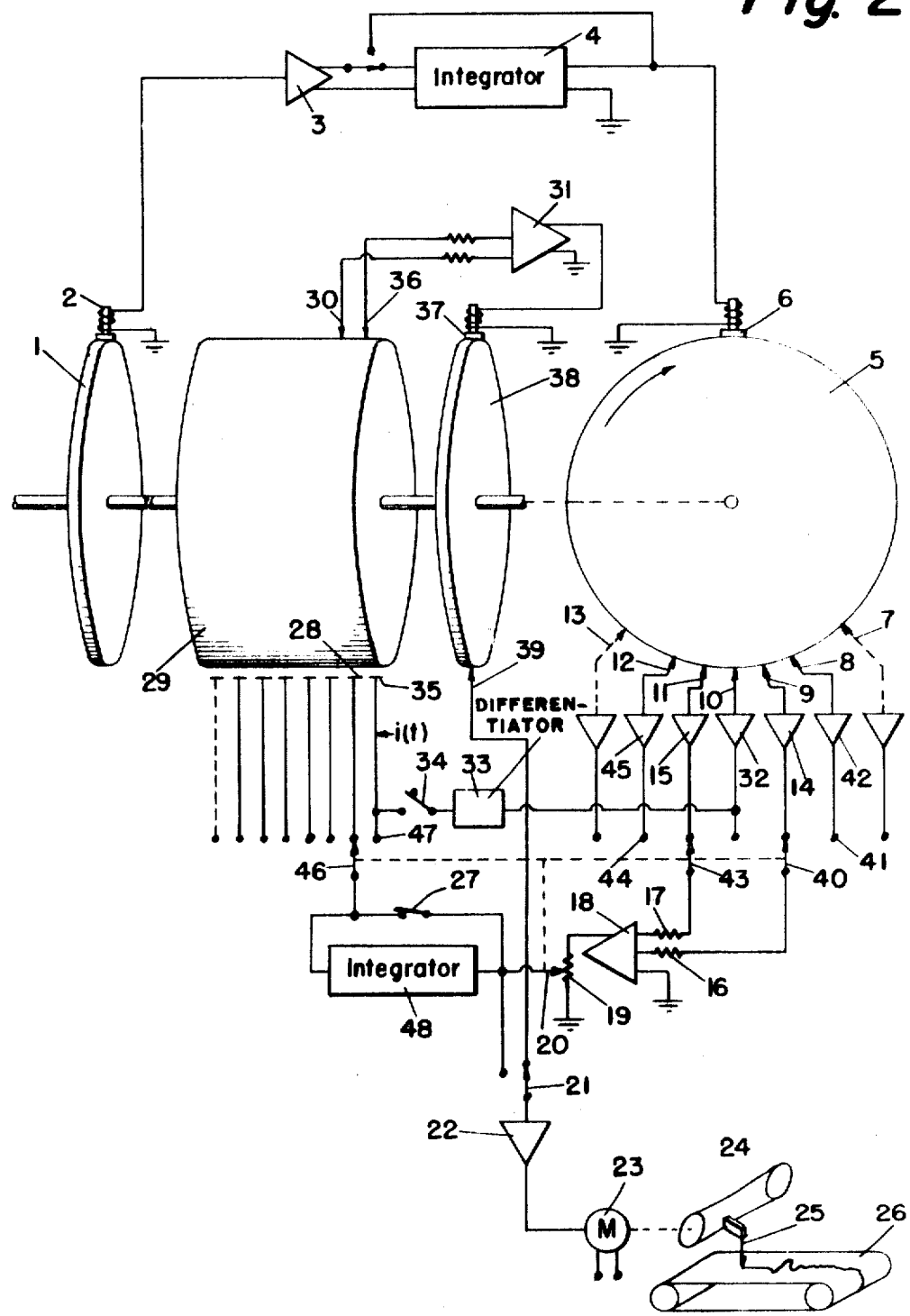
FIG. 2 shows analog equipment used in carrying out the principles of this invention.

Referring now to FIG. 1a, there has been illustrated an operator $h_{\pm\lambda/2}(t)$. The length of the operator is $\lambda$, the time $t=0$ is taken at the midpoint of the operator and, thus, the distance from $t=0$ will be $\lambda/2$ to the two extremities of the operator. A comparison of FIGS. 1a, 1b and 1c reveals that the operator of FIG. 1a is made up of two unit-step functions. These are respectively defined as follows: $u_o(t+\lambda/2)$ and $-u_o(t-\lambda/2)$. Accordingly, the operator of FIG. 1a may be expressed:

(1) $h_{\pm\lambda/2}=1/\lambda[u_o(t+\lambda/2)-u_o(t-\lambda/2)]$

In the foregoing equation, it will be noticed that the quantity $1/\lambda$ appears in the right-hand side of the equation in order to normalize the same; i.e., to make the area of the operator independent of the length of the operator.

If the unit-step function of FIG. 1b is convolved with a function varying in amplitude along a scale, the mathematical expression, therefore, will be as follows:

(2) $u_o(t+\lambda/2)*i(t)=\int i(t+\lambda/2)dt$

Similarly, where the unit step function of FIG. 1c is convolved with the same function $i(t)$ varying along a scale, the mathematical expression is:

(3) $-u_o(t-\lambda/2)*i(t)=-\int i(t-\lambda/2)dt$

Rewriting equations (2) and (3) in terms of the operator of FIG. 1a, the following is obtained:

(4) $h_{\pm\lambda/2}*i(t)=1/\lambda[\int i(t+\lambda/2)dt-\int i(t-\lambda/2)dt]$ The operator $h_{\pm\lambda/2}(t)$ in FIG. (1a) is the impulse response of a filter when it is convolved as in equation (4) to modify a function $i(t)$. Equation (4) represents the filter action of $h_{\pm\lambda/2}(t)$ on $i(t)$ and is an expression for the output of a filter defined by $h_{\pm\lambda/2}(t)$ when the input is $i(t)$. It is common practice to express the character of filters in terms of frequency response to the filter which is the frequency transform of the impulse response. Frequency magnitude responses are shown in FIGS. 1d, 1f, 1h and 1j. Since the impulse responses are all symmetrical, the phase responses are everywhere zero. FIG. 1a and equation (1) define the impulse response of the filter The output of the filter is defined by the input convolved with the impulse response as defined by equation (4). The frequency spectrum of the output is shown in FIG. 1d.

Referring now to FIG. 1d, it will be seen that the log of frequency has been plotted as abscissa (Log $f$) and that the attenuation in decibels has been plotted as ordinates for the time function $h_{\pm\lambda/2}(t)$ in FIG 1a. This is the frequency response of a filter whose impulse response is $h_{\pm\lambda/2}(t)$. A line 10 indicates the zero attenuation (in decibels per octave) slope, and a line 11 illustrates that at the point $1/\lambda$ the attenuation changes to a slope of the order of −6 decibels per octave. The result of convolving a function $i(t)$ with the operator of FIG 1a is to modify the spectrum of $i(t)$ as illustrated by the graph 12, which is recognizable as a low-pass filter; i.e., one which passes frequencies with little attenuation so long as they are of a low order with respect to the frequency $1/\lambda$ and as they arrive at values greater than $1/\lambda$, the attenuation rapidly increases It will be obvious to those skilled in the art that an operator of the kind illustrated in FIG. 1a may be readily programmed for operation with a digital computer. As for the function $i(t)$, this too may be readily sampled and converted into digital form for the operations in the computer of the steps specified by equation (4). While the invention may be practiced by utilizing computers of the digital type, the invention may likewise be practiced on the analog equipment illustrated in FIG. 2 and which will now be described.

The function $i(t)$ which varies in amplitude with time is recorded on the magnetic drum 1. The function $i(t)$ is reproduced by the pickup head 2 as the drum 1 rotates under the pickup head. The function $i(t)$ is amplified in amplifier 3 and integrated in integrator 4 to produce the function $\int i(t)\, dt$ at the output of integrator 4. This integrator is preferably of high quality and may be of the type illustrated at pages 12—20 in the book by Korn and Korn entitled *The Electronic Analog Computer*, 2nd Edition, 1956.

The output from integrator 4 is recorded on a magnetic drum 5 by means of the recording head 6. A plurality of pickup heads 7—13 are associated with magnetic drum 5. These pickup heads are spaced one from another by an amount corresponding to the interval $\lambda/2$. If a reference point be selected on the drum 5, as for example at the pickup head 10, then the remainder of the pickup heads will be positioned with respect to this reference point as follows: pickup head 9 at $+\lambda/2$; pickup head 8 at $+\lambda$; pickup head 7 at $+3\lambda/2$; pickup head 11 at $-\lambda/2$; pickup head 12 at $-\lambda$; and pickup head 13 at $-3\lambda/2$.

Since the function $\int i(t)dt$ has been recorded on the drum 5, the function picked up at the pickup head 9 can be represented as $\int i(t+\lambda/2)dt$. Similarly, the output at pickup head 11 represents the function $\int i(t-\lambda/2)\, dt$. These two functions are respectively amplified in amplifiers 14 and 15 and applied through resistors 16 and 17 to the amplifier 18. The output of amplifier 15 is inverted in phase with respect to the output of amplifier 14. Therefore, the output of amplifier 18 is proportional to $\int i(t+\lambda/2)dt - \int i(t-\lambda/2)dt$. This output is applied to a voltage divider 19 which divides the voltage by an amount proportional to $\lambda$. Stated another way, the voltage is multiplied by $1/\lambda$. Therefore, the voltage on the movable contact 20 is proportional to:

(5) $h_{\pm\lambda/2} = 1/\lambda [\int i(t+\lambda/2)dt - \int i(t-\lambda/2)dt\ ]$ which is the desired output as defined by equation (4).

The voltage on the movable contact 20 can be applied directly to an output recorder. This can be accomplished )—the switch 21 to its left-hand )—connecting hmovable contact 20 to the amplifier 22. The amplifier 22 drives a motor 23 which positions a belt 24 carrying the recording pen 25. The recording pen 25 traces a reproduction of the function (5a) $h_{\pm\lambda/2} = 1/\lambda[\int i(t+\lambda/2)dt - \int i(t-\lambda/2)dt]$ on the moving recording medium 26.

Convolution with other operators may be accomplished in accordance with this invention by combinations of shifting, integrating and subtracting the basic convolution function which has just been described. Developing output functions in this manner results in improved operation over the technique of straightforward mathematical convolution.

As a further example, consider convolution with the operator:

(6) $h_a(t) = [u_1(t) - h_{\pm\lambda/2}(t)]$ where: $u_1(t)$ is a unit impulse function, and $h_{\pm\lambda/2}(t)$ is the function defined in equation (1). This operator is shown in FIG. 1e. Convolution of a function which varies in amplitude along a scale with this operator produces high pass filtering of the function as is shown in FIG. 1f. FIG. 1f shows an attenuation of 6 db./oct of frequencies in the function $h(t)$ below $1/\lambda$. Convolution with this operator produces an output defined as follows:

(7) $i(t)*[u_1(t)-h_{\pm\lambda/2}(t)] = i(t) - 1/\lambda[\int 1(t-\lambda/2)dt - \int 1(t+\lambda/2)dt]$ The last expression in equation (7); namely, $1/\lambda[\int i(t-\lambda/2)dt - \int i(t+\lambda/2)dt]$, which is $i(t)*h_{\pm\lambda/2}(t)$, is generated with the analog equipment of FIG. 2 as just described above. If we merely subtract this function, which appears on the movable contact 20, from a )—of $i(t)$, then convolution with the operator shown in FIG. 1e will have been accomplished. To do this the switch 21 is moved to its right-hand position as shown. The function $i(t)*h_{\pm\lambda/2}(t)$ is applied through switch 27 to the recording )—which records the function on the drum 29. The function $i(t)*h_{\pm\lambda/2}(t)$ is picked up by the pickup head 30 which applies the function to the amplifier 31.

A function representative of $i(t)$ is picked up by the pickup head 10 from the drum 5. The signal picked up by pickup head 10 is $\int i(t)dt$. This function is applied through switch 34, which is closed, to the recording head 35. The function $i(t)$ is recorded on drum 29. It is picked up by the pickup head 36 which applies the function to the amplifier 31. The function $i(t)*h_{\pm\lambda/2}(t)$, from pick-up head 30, is applied to amplifier 31 with an opposite phase with respect to the function $i(t)$ so that the output of amplifier 31 is proportional to $i(t) - i(t)*h_{\pm\lambda/2}(t)$. This function is applied to recording head 37 which records the function on the drum 38. The function is picked up at the pickup head 39 which applies the function to the amplifier 22 resulting in the recording of the function $i(t) - i(t)*h_{\pm\lambda/2}(t)$ on the recording medium 26. In this manner this function has been derived in a much more satisfactory manner than would have been possible if straightforward mathematical convolution had been used.

Band-pass filtering can be achieved by a further extension of the principles of this invention. Band-pass filtering is achieved by convolution of the function $i(t)$ with an operator such as that shown in FIG. 1g. This operator is the difference between two operators, $h_{\pm\lambda/2}(t)$ and $h_{\pm\lambda/2}(t)$. In order to achieve band-pass filtering, it is necessary that the amplitudes and time intervals of the two operators be so related that the net area is zero. While the operators have been shown as having intervals of $\lambda$ and $2\lambda$ it will be appreciated that other intervals may be chosen if the amplitudes are adjusted so that the net area is zero. The frequency response of the filter is shown in FIG. 1h. In accordance with this invention, convolution with the operator $h_b(t) = h_{\pm\lambda/2}(t) - h_{\pm\lambda/2}(t)$ is achieved by subtracting the function $i(t)*h_{\pm\lambda/2}(t)$ from the function $i(t)*h_{\pm\lambda/2}(t)$. The function $i(t)*h_{\pm\lambda/2}(t)$ is developed at the movable contact 20 as previously described and this function is applied to the recording head 28 which records the function on the drum 29.

In order to generate the function $i(t)*h_{\pm\lambda/2}(t)$, the stepping switch 40 is moved to the contact 41 so that the output of pickup head 8 is applied through amplifier 42 to the amplifier 18. Similarly, the stepping switch 43 is moved to the position 44 so that the output of pickup head 12 is applied through amplifier 45 to the amplifier 18. The movable contact 20 is moved to a position on voltage divider 19 so that the output of amplifier 18 is divided by $2\lambda$. The stepping switch 46 is moved to the position 47 so that the function $i(t)*h$ $(t)$ is applied to recording head 35 which records the function on the magnetic drum 29.

When both functions $i(t)*h_{\pm\lambda/2}(t)$ and $i(t)*h_{\pm\lambda}(t)$ have been recorded on drum 29, they are played back and simultaneously picked up by pickup heads 30 and 36 which apply the two functions to the amplifier 31 with a phase such that $i(t)*h_{\pm\lambda}(t)$ is subtracted from $i(t)*h_{\pm\lambda/2}(t)$. The output of amplifier 31 is recorded on drum 38 and subsequently picked up by pickup head 39 and recorded on the movable recording medium 26.

As a final example of the principles of this invention, consider the operator $h_c(t) = \int[(t+\lambda)u_o(t+\lambda) - \sqrt{8}(t+\lambda/2)u_o(t+\lambda/2) + 2\sqrt{8}\ tu_o(t) - (1+2\sqrt{8})(t-\lambda/2)u_o(t-\lambda/2) + (t-\lambda)u_o(t-\lambda)]dt$ .

shown in FIG. 1i. The weighting values of a constant times $\sqrt{8}$ are here applied to make the net area under $h_c(t)$ equal to zero. Convolution with this operator will produce sharp bandpass filtering as shown in FIG. 1j.

This may be accomplished quite simply in accordance with my invention by separately integrating the outputs of each of the pickup heads 8, 9, 10, 11 and 12. First, the output of pickup head 8 is applied through amplifiers 42 and 18, divided by the proper constant in voltage divider 19 and integrated in integrator 48. Integrator 48 is inserted into the circuit by opening the switch 27. The output of integrator 48 is applied through stepping switch 46 and position 47 to the recording head 35 to record the first function on the drum 29.

Next, the output from pickup head 9 is applied through amplifier 14, switch 40, amplifier 18, voltage divider 19 and integrator 48 to the recording head 28 to record that function on the drum 29. Similarly, the outputs from pickup heads 10, 11 and 12 are each integrated and recorded as separate traces on the drum 29. When all of these functions have been recorded, they are simultaneously played back and combined in the amplifier 31 to produce the function $h_c(t)$ at the output thereof. As before, this function is recorded on drum 38 and ultimately drives the recording pen 25 to record the function on the movable medium 26.

While particular embodiments of the invention have been shown and described it will, of course, be understood that various changes may be made without departing from the principles of the invention. These might include adding of more shifted step functions to obtain a more complicated impulse response than $h_b(t)$ in FIG. 1g, or integrating or differentiating one or more times the functions so obtained. The appended claims are therefore intended to cover any such modifications within the true spirit and scope of the invention.

I claim:

1. The method of convolving a function signal $i(t)$, said function signal representing a quantity which varies in amplitude along a scale, with an operator signal $$h_b = [h_{*\lambda/2}(t) - h_{*\lambda}(t)][h_b = h_{*\lambda/2}(t) - h_{*\lambda}(t)]$$

said method comprising the following steps each executed by automatic computing apparatus:

convolving said function signal $i(t)$ with an operator signal $h_{*\lambda/2}(t)$ representing a first pair of step function signals respectively positive and negative and occurring at different positions along said scale by algebraically adding together at least two function signals, one, the integral of signal $i(t)$ shifted along said scale by an amount indicated by one of said pair of step functions and the other, the integral of signal $i(t)$ shifted along said scale by an amount indicated by the other of said pair of step function signals, said first pair of step function signals being respectively displaced along said scale by an amount $\pm\lambda/2$ from a reference point, said last-named convolving operating producing an output signal $i(t)*h_{*\lambda/2}(t)$, convolving said function signal $i(t)$ with an operator signal $h_{*\lambda}(t)$ representing a second pair of step function signals respectively positive and negative and occurring at different positions along said scale by algebraically adding together at least two function signals, one, the integral of signal $i(t)$ shifted along said scale by an amount indicated by one of said second pair of step functions and the other, the integral of signal $i(t)$ shifted along said scale by an amount indicated by the other of said second pair of step function signals, said second pair of step function signals being respectively displaced along said scale by an amount $\pm\lambda$ from a reference point, said last-named convolving operation producing an output signal $i(t)*h_{*\lambda}(t)$, and subtracting said output signal $i(t)*h_{*\lambda}(t)$ from said output signal $i(t)*h_{*\lambda/2}(t)$.

2. The method of filtering a function signal $i(t)$ which varies in amplitude along a scale comprising the following steps each executed by automatic computing apparatus:

integrating said signal $i(t)$ to produce the function signal $\int i(t)dt$, storing the function signal $\int i(t)dt$, in a storage device for shifting said function along said scale, shifting the function signal $\int i(t) dt$ along said scale by an amount $\lambda/2$ in one direction to produce the function signal $\int i(t+\lambda/2)dt$, shifting the function signal $\int i(t)dt$ along said scale in the other direction by an amount $\lambda/2$ to produce the function signal $\int i(t-\lambda/2)dt$, subtracting the function signal $\int i(t-\lambda/2)dt$ from the function signal $\int i(t+\lambda/2)dt$ to produce the function signal $\int i(t+\lambda/2)dt - \int i(t-\lambda/2)dt$, and normalizing said last-named function signal by multiplying said function signal by an amount proportional to $1/\lambda$ to produce the function signal $$\frac{1}{\lambda}\{i(t+\lambda/2)dt - \int i(t-\lambda/2)dt\}$$

$$\left[\frac{1}{\lambda}\int i(t+\lambda/2)dt - \int i(t-\lambda/2)dt\right]$$

representing low-pass filtering of said function signal $i(t)$.

3. The method recited in claim 2 further including the step of subtracting the function signal $$\left[\frac{1}{\lambda}[\int i(t-\lambda/2)dt - \int i(t-\lambda/2)dt]\right]$$

$$\frac{1}{\lambda}\{\int i(t-\lambda/2)dt - \int i(t-\lambda/2)dt\}$$

from signal $i(t)$ to produce an output signal representing high-pass filtering of the function signal $i(t)$.

4. The method recited in claim 3 including the further steps of:

shifting the function signal $\int i(t)dt$ along said scale by an amount $\lambda$ in one direction to produce the function signal $\int i(t+\lambda)dt$, shifting the function signal $\int i(t)dt$ along said scale in the other direction by an amount $\lambda$ to produce the function signal $\int i(t-\lambda)dt$, subtracting the function signal $\int i(t-\lambda)dt$ from the function signal $\int i(t+\lambda)dt$ to produce the function signal $\int i(t+\lambda)dt - \int i(t-\lambda)dt$, normalizing said last-named function signal by multiplying the function signal by an amount proportional to $1/2\lambda$ to produce the function signal $$\left[\frac{1}{2\lambda}[\int i(t+\lambda)dt - \int s(t-\lambda)dt]\right]$$

$$\frac{1}{2\lambda}\{\int i(t+\lambda)dt - \int i(t-\lambda)dt\}$$

and subtracting the function signal $$\left[\frac{1}{2\lambda}[\int i(t+\lambda)dt - \int i(t-\lambda)dt]\right]$$

$$\frac{1}{2\lambda}\{\int i(t+\lambda)dt - \int i(t-\lambda)dt\}$$

from the function signal $$\left[\frac{1}{2\lambda}[\int i(t+\lambda/2)dt - \int i(t-\lambda/2)dt]\right]$$

$$\frac{1}{2\lambda}\{\int i(t+\lambda/2)dt - \int i(t-\lambda/2)dt\}$$

to produce band-pass filtering of the function signal $i(t)$.

5. Computing apparatus for filtering an input signal $i(t)$ comprising:

an integrator, said input signal $i(t)$ being applied to said integrator to produce at the output thereof the signal $\int i(t)dt$, a storage unit, the signal at the output of said integrator being stored in said storage unit, means for extracting from said storage unit two components of the signal stored therein, time shifted by amounts $\lambda/2$ and $-\lambda/2$, said two components being the signals $\int i(t+\lambda/2)t$ and $\int i(t-\lambda/2)dt$, difference means, both of said last-named signals being applied to said difference means to produce the output signal $\int i(t+\lambda/2)dt - \int i(t-\lambda/2)dt$, and a multiplier, said last-named signal being applied to said multiplier, said multiplier being set to multiply said last-named signal by $1/\lambda$ to produce the output signal $$[1/\lambda[\int i(t+\lambda/2)dt - \int i(t-\lambda/2)dt]]$$

$1/\lambda\{\int i(t+\lambda/2)dt - \int i(t-\lambda/2)dt\}$ representing low-pass filtering of the input signal $i(t)$.

6. The apparatus recited in claim 5 further including:
means for applying the output signal
$$[1/\lambda[\int i(t+\lambda/2)dt - \int i(t-\lambda/2)dt]]$$

$1/\lambda\{\int i(t+\lambda/2)dt - \int i(t-\lambda/2)dt\}$ and the input signal $i(t)$ to said difference means to produce an output representing high-pass filtering of the input signal $i(t)$.

7. The apparatus recited in claim 6 further including:
means for extracting from said storage unit two components of the signal stored therein, time shifted by amounts proportional to $\lambda$ and $-\lambda$, said two components being the signals $\int i(t+\lambda)dt$ and $\int i(t-\lambda)dt$, means for applying said last-named signals to said difference means to produce the output signal $\int i(t+\lambda)dt - \int i(t-\lambda)dt$, said last-named output signal being applied to said multiplier which is set to $1/2\lambda$ to produce the output $$[1/2\lambda[\int i(t+\lambda)dt - \int i(t-\lambda)dt]]$$
$$1/2\lambda\{\int i(t+\lambda)dt - \int i(t-\lambda)dt\}, \text{ and}$$

means for applying said last-named output and the output signal $$[1/\lambda[\int i(t+\lambda 2)dt - \int i(t-\lambda 2)dt]]$$
$$1/\lambda\{\int i(t+\lambda/2)dt - \int i(t-\lambda/2)dt\}$$

to said difference means to produce an output signal representing band-pass filtering of the input signal $i(t)$.

8. Computing apparatus for filtering an input signal $i(t)$ comprising:

an integrator, said input signal $i(t)$ being applied to said integrator to produce at the output thereof the signal $\int i(t)dt$, a storage unit, the signal at the output of said integrator being stored in said storage unit, means for extracting from said storage unit two components of the signal stored therein, time shifted by amounts $\lambda/2$ and $-\lambda/2$, said two components being the signals $\int i(t+\lambda/2)t$ and $\int i(t-\lambda/2)dt$, difference means, both of said last-named signals being applied to said difference means to produce the output signal $\int i(t+\lambda/2)dt - \int i(t-\lambda/2)dt$, a multiplier, said last-named signal being applied to said multiplier, said multiplier being set to multiply said last-named signal by $1/\lambda$ to produce the output signal $$[1/\lambda[\int i(t+\lambda/2)dt - \int i(t-\lambda/2)dt]]$$
$$1/\lambda\{\int i(t+\lambda/2)dt - \int i(t-\lambda/2)dt\}$$

representing low-pass filtering of the input signal $i(t)$, means for extracting from said storage unit two components of the signal stored therein, time shifted by amounts proportional to $\lambda$ and $-\lambda$, said two components being the signals $\int i(t+\lambda)dt$ and $\int i(t-\lambda)dt$, means for applying said last-named signals to said difference means to produce the output signal $\int i(t+\lambda)dt - \int i(t-\lambda)dt$, said last-named output signal being applied to said multiplier to produce the output $$[1/2\lambda[\int i(t+\lambda)dt - \int i(t-\lambda)dt]]$$
$$1/2\lambda\{\int i(t+\lambda)dt - \int i(t-\lambda)dt\}, \text{ and}$$

means for generating a signal representing the difference between said last-named output and the output signal $$[1/\lambda[\int i(t+\lambda/2)dt - \int i(t-\lambda/2)dt]]$$
$$1/\lambda\{\int i(t+\lambda/2)dt - \int i(t-\lambda/2)dt\}$$

to produce an output signal and representing band-pass filtering of the input signal $i(t)$.

Page 1 of 2 pages.

UNITED STATES PATENT OFFICE

CERTIFICATE OF CORRECTION

Patent No. 3,598,982          Dated August 10, 1971

Inventor(s) Philip L. Lawrence

It is certified that error appears in the above-identified patent and that said Letters Patent are hereby corrected as shown below:

In the second column of the title page, under "Attorneys", "Donald J. Dickson" should be --Donald L. Dickerson--.
Column 1, line 50, "two-step" should read --two step--.
Column 1, line 61; Column 2, line 16 and line 24, "unit-step" should read --unit step--.
Column 3, line 36, cancel ")=" and insert --by moving--;
    same line, cancel")—" and insert --contact, thereby--;
    line 65, cancel ")—" and insert --function representative--; and
    line 69, cancel")—" and insert --head 28--.
Column 4, lines 5 and 6, "$i(t) - i(t)*h_{\lambda 2}(t)$" should read
    -- $i(t) - i(t)* h_{\pm\lambda/2}(t)$ --;

line 9, "$i(t) - i(t)*h_{\lambda/2}(t)$" should read
    -- $i(t) - i(t)*h_{\pm\lambda/2}(t)$ --;

line 18, after "and" and before the period (.), "$h_{\pm\lambda/2}(t)$" should read -- $h_{\pm\lambda}(t)$ --;

line 27, that portion of the formula reading "$-h_{\pm\lambda/2}(t)$" should read -- $-h_{\pm\lambda}(t)$ --;

line 28, that portion of the formula reading " $*h_{\pm\lambda/2}(t)$ " should read -- $*h_{\pm\lambda}(t)$ --;

line 33, that portion of the formula reading " $*h_{\pm\lambda/2}(t)$" should read -- $*h_{\pm\lambda}(t)$ --; and line 41, "$i(t)*h(t)$" should read
    -- $i(t)*h_{\pm\lambda}(t)$ --.

Delete the bracketed material which appears in column 5, line 19 and line 74; column 6, line 4, line 27, line 35, line 40, line 64, and line 69; column 7, line 7 and line 11; and column 8, line 7, line 18, and line 22.

PO-1050
(5/69)

UNITED STATES PATENT OFFICE
CERTIFICATE OF CORRECTION

Patent No. 3,598,982     Dated August 10, 1971

Inventor(s) Philip L. Lawrence

It is certified that error appears in the above-identified patent and that said Letters Patent are hereby corrected as shown below:

The foregoing paragraph corrects printing errors in which bracketed material in the claims of the patent application were printed instead of being deleted as indicated by the bracketing.

Column 5, line 50, " $i(t)*h \lambda(t)$ " should read -- $i(t)*h_{\pm\lambda}(t)$ --.

Column 6, lines 56 and 57, " $i(t+\lambda/2)t$ " should read -- $i(t+\lambda/2)dt$ --.

Column 7, lines 24 and 25, " $i(t+\lambda/2)t$ " should read -- $i(t+\lambda/2)dt$ --.

Signed and sealed this 28th day of March 1972.

(SEAL)
Attest:

EDWARD M. FLETCHER, JR.
Attesting Officer

ROBERT GOTTSCHALK
Commissioner of Patents

Disclaimer 3,598,982.—*Philip L. Lawrence*, Riverside, Conn. SYSTEMS FOR MODIFYING FUNCTIONS INCLUDING A CONVOLUTION OPERATION. Patent dated Aug. 10, 1971. Disclaimer filed June 16, 1971, by the assignee, *Mobil Oil Corporation*.

Hereby disclaims the portion of the term of the patent subsequent to May 4, 1988.

[*Official Gazette November 6, 1973.*]